United States Patent [19]
Brouwer et al.

[11] Patent Number: 6,162,346
[45] Date of Patent: Dec. 19, 2000

[54] PROCESS FOR RECOVERY OF ZINC FROM SPHALERITE CONTAINING ORES OR CONCENTRATES

[75] Inventors: Sybolt Brouwer, Antwerp; Dirk Vanhoutte, Langdorp, both of Belgium

[73] Assignee: N.V. Union Miniere S.A., Olen, Belgium

[21] Appl. No.: 09/142,539

[22] PCT Filed: Mar. 6, 1997

[86] PCT No.: PCT/EP97/01115

§ 371 Date: May 13, 1999

§ 102(e) Date: May 13, 1999

[87] PCT Pub. No.: WO97/33007

PCT Pub. Date: Sep. 12, 1997

[30] Foreign Application Priority Data

Mar. 7, 1996 [EP] European Pat. Off. .............. 96200620

[51] Int. Cl.[7] .............................. C25C 1/16; C22B 19/00
[52] U.S. Cl. ........................ 205/604; 205/606; 205/607; 423/109; 423/110
[58] Field of Search ................................... 423/109, 110; 205/604, 606, 607, 608; 75/431

[56] References Cited

U.S. PATENT DOCUMENTS 4,049,770   9/1977   Swinkels et al. ........................ 423/109

FOREIGN PATENT DOCUMENTS

| 195650 | 9/1986 | European Pat. Off. . |
| 701555 | 12/1953 | United Kingdom . |
| WO9013679 | 11/1990 | WIPO . |

OTHER PUBLICATIONS

Database WPI, Week 37, 1983, Derwent Publications Ltd., London, GB; AN83–26972k, Su 926045 Abstract, May, 1982.

*Primary Examiner*—Steven Bos
*Attorney, Agent, or Firm*—Antonelli, Terry, Stout & Kraus, LLP

[57] ABSTRACT

A process for recovery of zinc from sphalerite containing ores or concentrates, whereby, in a first step, these ores or concentrates are submitted to a thermal treatment consisting essentially of a heating cycle performed under non-oxidizing conditions above 900° C. thereby at least partly transforming the sphalerite to wurtzite, and subsequently the wurtzite is quenched in such conditions as to retain at least partly the wurtzite after quenching. In a second step zinc is leached out of the converted ore or concentrate, and in a third step zinc is recovered from the leaching solution by electrolysis.

11 Claims, No Drawings

PROCESS FOR RECOVERY OF ZINC FROM SPHALERITE CONTAINING ORES OR CONCENTRATES

FIELD OF THE INVENTION

The invention concerns a process for recovery of zinc from sphalerite containing ores or concentrates, whereby, in a first step, these ores or concentrates are submitted to a thermal treatment to convert sphalerite to a substance that is more readily attacked in hydrometallurgical media and, in a second step, said substance is leached.

BACKGROUND OF THE RELATED ART

According to the state of the art, sphalerite containing ores or concentrates are submitted to a roasting step wherein the ore or concentrate is oxidized at an elevated temperature. In this roasting step, zinc sulfide is converted to zinc oxide while liberating $SO_2$ and heat. subsequently zinc oxide is leached to bring it into solution. This traditional flowsheet has several disadvantages: the $SO_2$ has to be further processed and results in a high amount of sulfuric acid. Also, the leaching which is carried out in sulfuric acid, normally necessitates two steps, whereby in a first step the ore or concentrate is submitted to neutral leaching and, in a second step, the remaining zinc ferrites are conducted to strong acid leaching. The iron which has dissolved during the strong acid leaching is precipitated, depending upon the method, as jarosite, goethite or hematite.

SUMMARY OF THE INVENTION

The invention has as an aim, among others, to present a process which renders it possible to generate much less acid than in the process according to the state of the art and to carry out the leaching in a single step instead of two.

DETAILED DESCRIPTION OF THE PREFERRED EMBODIMENTS

For this purpose, according to the invention, said thermal treatment consists essentially of a heating cycle performed under non-oxidizing conditions and above the inversion temperature of sphalerite to wurtzite, i.e. above 900° C., allowing sphalerite to be, at least partly, transformed to wurtzite, and of a rapid cooling cycle, e.g., quenching, performed in such conditions as to retain, at least partly, this wurtzite at low temperature.

It is presumed that the inversion temperature of sphalerite to wurtzite is function of the amount of impurities in the sphalerite, in such a way that, the larger the amount of iron dissolved in sphalerite, the lower said inversion temperature would be.

In a preferred embodiment of the invention, the heating cycle is performed at a temperature above 1020° C.

According to another preferred embodiment of the invention, the said rapid cooling cycle is carried out by quenching in water or in said hydrometallurgical media.

Leaching in the second step can take place in all kinds of acid, neutral or basic hydrometallurgical media capable of leaching zinc out of wurtzite. Although, according to the state of the art, hydrometallurgical media used for leaching usually contain sulfuric acid, it is also possible to use solutions containing HCl, NaOH, $NH_4^+$ ions (e.g. $NH_4Cl$ solutions) or others; HCl and/or $H_2SO_4$ are used in a preferred embodiment of the invention.

Leaching can be performed under non-oxidizing conditions or under oxidizing conditions, for instance with $O_2$ or $Cl_2$ as oxidizing agent.

After leaching, the zinc containing solution is purified and subsequently zinc is recovered from this solution by electrolysis.

Other characteristics and advantages of the invention will result from the description of a specific embodiment of the process for treating ores or bulk concentrates according to the invention.

To be mentioned is EP-A-0195650 which discloses a process for the recovery of zinc from iron-bearing sulphidic zinc concentrates. The concentrates, which contain sphalerite, are hereby subjected to an oxidation roasting step in an oxygen deficient atmosphere at 700–1050° C. In this step, iron is oxidised preferentially and the formation of zinc ferrites, which would require a separate and costly treatment, is retarded. The iron containing fraction and the unreacted zinc sulphide containing fraction are then separated and further processed. WO-A-9013679 also describes a very similar process of selective roasting of iron in zinc sulphide ores or concentrates by using an oxygen deficient atmosphere at 700 and 1050° C.

The following comparative experiment on two samples of a zinc sulfide concentrate from Brunswick Mining and Smelting is given as an example only, without limiting the scope of the invention. The approximate wt % analysis of the concentrate is: 52 Zn, 10 Fe, 2.0 Pb, 0.4 Cu, 33.6 S and 2 wt % of typical impurities including $SiO_2$, MgO, $Al_2O_3$ and CaO. One sample has been heated to a temperature of about 1100° C. and was cooled down quickly. Subsequently, from each sample 100 g was leached in 1 liter of a 6 N HCl solution at 90° C. For the heat treated sample a residue of only 4 g remained, while for the non-treated sample a residue of 50 g remained. When heating the concentrate to the temperature of 1100° C., the sphalerite of the sample transformed to wurtzite, which was retained by rapid cooling by means of a quench in water. Consequently, it has been proven that the non-oxidizing leaching of ZnS, according to the reaction $ZnS+2H^+ \rightarrow Zn^{++}+H_2S$, can be promoted by transforming sphalerite into wurtzite by a combination of heat treatment and rapid cooling.

In this experiment, the wurtzite leaching reaction produced $ZnCl_2$ and $H_2S$. Zinc can be recovered from the solution by electrolysis, after the necessary purification is performed. The electrolysis generates zinc at the cathode and $Cl_2$ at the anode. Particularly, this $Cl_2$ can be reacted with the $H_2S$ generated by the leaching reaction, thus producing elementary sulfur, which is easier to stockpile than sulfuric acid, and HCl, which can be recycled to the leaching step. Alternatively, the $H_2S$ and/or $Cl_2$ can be used directly as a reagent in a large number of other hydrometallurgical operations.

The invention is of course not limited to the example and description of the embodiments of the process given hereinabove.

What is claimed is:

1. A process for recovery of zinc from sphalerite-containing ores or concentrates, comprising the steps of:

subjecting sphalerite-containing ore or concentrate to a thermal treatment to convert sphalerite to wurtzite;

leaching zinc out of said wurtzite in a leaching solution; and recovering zinc from the leaching solution by electrolysis;

wherein said thermal treatment consists essentially of a heating cycle performed under non-oxidizing conditions and above 900° C., to at least partly transform the sphalerite to wurtzite, and quenching the wurtzite in such conditions as to retain at least partly the wurtzite after quenching.

2. The process according to claim 1, wherein:
said thermal treatment is performed above 1020° C.

3. The process according to claim 1, wherein:
said quenching is carried out in water or in a hydrometallurgical media.

4. The process according to claim 1, wherein:
the leaching step comprises leaching in an acid solution.

5. The process according to claim 4, wherein:
said acid solution contains at least one of hydrochloric acid and sulfuric acid.

6. The process according to claim 1, wherein:
the leaching step is performed under non-oxidizing conditions.

7. The process according to claim 1, wherein:
any $H_2S$ generated in the leaching step is recovered.

8. The process according to claim 1, wherein:
the leaching step is performed under oxidizing conditions with $O_2$ or $Cl_2$ as an oxidizing agent.

9. The process according to claim 1, wherein:
the leaching step is performed in presence of $NH_4^+$ ions.

10. The process according to claim 1, wherein:
the leaching step is performed in one of a neutral or an alkaline solution.

11. The process according to claim 1, wherein:
the solution obtained in the leaching step is purified.

* * * * *